United States Patent
Imboden et al.

(10) Patent No.: US 6,713,110 B2
(45) Date of Patent: Mar. 30, 2004

(54) ASSEMBLY FOR GENERATING MILK FOAM AND FOR HEATING MILK

(75) Inventors: David Imboden, Kappel (CH); Markus Anliker, Gränichen (CH)

(73) Assignee: Cafina AG, Hunzenschwil (CH)

( * ) Notice: Subject to any disclaimer, the term of this patent is extended or adjusted under 35 U.S.C. 154(b) by 0 days.

(21) Appl. No.: 10/293,583

(22) Filed: Nov. 13, 2002

(65) Prior Publication Data

US 2003/0089244 A1 May 15, 2003

(30) Foreign Application Priority Data

Nov. 14, 2001 (CH) .............................. 2088/01

(51) Int. Cl.[7] .............................. A23F 5/00; A47J 31/44
(52) U.S. Cl. ................. 426/511; 99/293; 99/323.1; 99/452; 261/DIG. 16; 261/DIG. 76; 426/433; 426/519
(58) Field of Search ................ 426/511, 519, 426/520, 590, 433, 506; 99/452, 323.1, 293, 286; 261/DIG. 16, DIG. 76

(56) References Cited

U.S. PATENT DOCUMENTS

| | | |
|---|---|---|
| 5,335,588 A | 8/1994 | Mahlich |
| 5,628,239 A | 5/1997 | Wu |
| 6,099,878 A  * | 8/2000 | Arksey ........................ 426/511 |

FOREIGN PATENT DOCUMENTS

| | | |
|---|---|---|
| DE | 89 07 183 U | 7/1989 |
| EP | 0 195 750 A2 | 9/1986 |
| EP | 0 607 759 A1 | 7/1994 |
| EP | 0 755 767 A1 | 1/1997 |
| EP | 0 803 220 A1 | 4/1997 |

* cited by examiner

Primary Examiner—George C. Yeung
(74) Attorney, Agent, or Firm—Maginot, Moore & Beck

(57) ABSTRACT

An assembly for generating milk foam and for heating milk comprises a milk supply container, a steam generator and a mixing element. The mixing element includes a first steam inlet channel, a necking located downstream of the first steam inlet channel, an air inlet channel opening into the necking and a milk inlet channel. The milk is fed to the milk inlet channel of the mixing element by means of a pump. Moreover, the mixing element is provided with a main channel whose inlet communicates with the necking, whereby the milk inlet channel opens into the main channel downstream of its inlet. Between the necking and the opening of the milk inlet channel, a second steam inlet channel opens into the main channel.

18 Claims, 3 Drawing Sheets

ASSEMBLY FOR GENERATING MILK FOAM AND FOR HEATING MILK

BACKGROUND OF THE INVENTION

The present invention refers to an assembly for generating milk foam and for heating milk, comprising a milk supply container, a steam generator and a mixing element.

Such assemblies are used particularly in espresso coffee machines. Thereby, the milk foam is required first and foremost for cappuccino coffee, while heated milk can be used both for preparing white coffee and hot milk beverages.

For generating milk foam, a plurality of so-called emulsifying devices are known in the art. Usually, they comprise a steam inlet channel opening into a suction chamber. The suction chamber is connected to and communicates with both a milk supply channel and an air supply channel. By means of the steam flowing through the suction chamber, a low pressure zone is generated therein, with the result that milk is sucked into the suction chamber through the milk supply channel and air is sucked into the suction chamber through the air supply channel. This steam/air/milk-mixture is brought into a turbulent flow in a subsequent emulsifying chamber, resulting in a hot emulsion consisting of milk and air.

PRIOR ART

Emulsifying devices of the kind described above are disclosed, for example, in the documents EP 0 195 750 and EP 0 755 767. However, these emulsifying devices are not suitable for heating milk that could be used for preparing white coffee or a hot milk beverage. The reason is that the milk is compellingly foamed by these devices, a fact that is not desired in preparing white coffee or a hot milk beverage. Thus, for heating milk, such coffee machines usually comprise a separate steam outlet pipe having a steam outlet nozzle located at the end thereof. Such a steam outlet pipe is immersed directly into the cup or mug containing the milk to be heated such that the steam flowing out of the nozzle into the cup or mug heats the milk contained therein.

It is understood that this method is relatively cumbersome and the operator of the coffee machine hardly can estimate the actual temperature of the milk, resulting in a milk beverage that is usually either too hot or not hot enough. Moreover, in a machine having an external steam outlet, the danger exists that the operator may be injured by the hot steam. Finally, an external steam outlet is hard to clean, particularly because milk deposits remain mainly at the outside of the steam outlet nozzle; it is even possible that, after the steam having been shut down, milk is sucked into the steam outlet from where it hardly can be removed.

OBJECTS OF THE INVENTION

Thus, it is an object of the present invention to provide an assembly for generating milk foam, comprising a milk supply container, a steam generator and a mixing element, that is equally suitable for heating milk.

SUMMARY OF THE INVENTION

To meet this and other objects, the present invention provides an assembly for generating milk foam and for heating milk, comprising a milk supply container, a steam generator and a mixing element. The mixing element comprises a first steam inlet channel, a necking located downstream thereof and communicating with the first steam inlet channel, having an inner diameter which is smaller than the diameter of the first steam inlet channel, an air inlet channel opening into and communicating with the necking, and a milk inlet channel.

A main channel, also provided in the mixing element, comprises an inlet end and an outlet end, whereby the inlet end communicates with the necking, and whereby the milk inlet channel opens into and communicates with the main channel at a location along the main channel that is downstream the inlet end thereof. Further, the mixing element comprises a second steam inlet channel opening into and communicating with the main channel at a point along the main channel located between the necking and the opening of the milk inlet channel.

Due to the fact that the assembly comprises a mixing element having a central main channel whose inlet communicates with the necking and downstream thereof with the milk inlet channel, whereby a second steam inlet channel opens into the main channel between the necking and the milk inlet channel, even two benefits result: On the one side, the amount of steam available for heating milk can be substantially increased by providing a second steam inlet channel. On the other side, an undesired foaming of the milk can be avoided due to the fact that the above mentioned second steam inlet channel opens into the main channel between the necking and the milk inlet channel, because the steam fed by the second steam inlet channel is not mixed with air that would cause a foaming of the milk.

BRIEF DESCRIPTION OF THE DRAWINGS

In the following, embodiments of the assembly according to the invention will be further described, with reference to the accompanying drawings, in which.

DETAILED DESCRIPTION OF PREFERRED EMBODIMENTS

Figure 1:
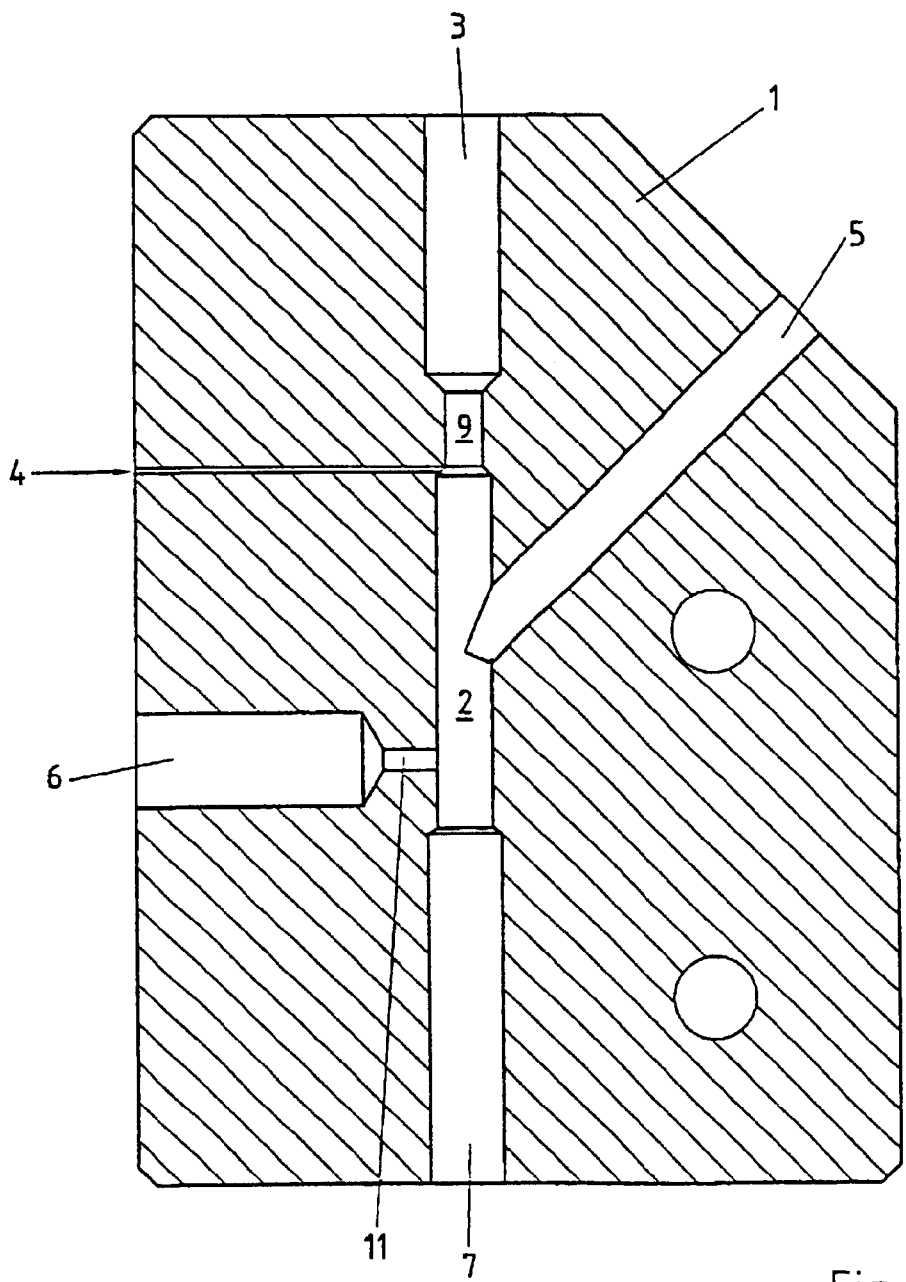
FIG. 1 shows a cross sectional view of a first embodiment of a mixing element.

As can be seen from the cross sectional view of FIG. 1, a mixing element 1 is designed as a one piece element and provided with a straight running main channel 2, a first steam inlet channel 3 extending coaxial to the main channel 2, an air inlet channel 4 running perpendicular to the axis of the main channel 2 and the first steam inlet channel 3, respectively, a second steam inlet channel 5 running oblique with respect to the axis of the main channel 2 and the first steam inlet channel 3, respectively, a milk inlet channel 6 running perpendicular to the axis of the main channel 2 and the first steam inlet channel 3, respectively, and an outlet channel 7 extending coaxial to the main channel 2.

Between the first steam inlet channel 3 and the main channel 2, a narrowed portion or necking 9 is provided for providing an underpressure zone. Thereby, the lower end (as seen in FIG. 1) of the first steam inlet channel 3 opens into said necking 9. At its downstream end, i.e. right end as seen in FIG. 1, the air inlet channel 4 radially opens into the necking 9, with the result that air is sucked in through the air channel 4 whenever steam flows from the first steam inlet channel 3 through the necking 9 due to the Venturi effect caused by the necking 9. The milk inlet channel 6 opens, at its downstream end, i.e. right side as seen in FIG. 1, into the main channel 2, whereby the milk inlet channel 6 comprises a bore 11 having a smaller diameter than the channel 6 at its end region where it opens into the main channel 2. This reduced diameter bore 11 renders it possible to very accurately meter the amount of milk fed to the main channel 2 per unit of time. The second steam inlet channel 5 opens into the main channel 2 between the necking 9 and the milk inlet channel 6 and runs, as already mentioned, oblique with respect to the main channel 2. Finally, the downstream end, i.e. the lower end (as seen in FIG. 1) of the main channel 2 axially opens into an outlet channel 7 having a greater diameter than the main channel 2 and leading out of the mixing element 1 at its bottom.

A mixing element 1 designed as described herein before is very easy to manufacture since all the afore mentioned channels can be machined for example by boring. One advantage of boring, amongst others, is that the channels can be machined within tight tolerances. Moreover, as can be clearly seen in FIG. 1, the mixing element 1 includes exclusively straight channels and bores, respectively, with the result that blind chambers and the like, up to now usual or even required, can be consciously avoided. Thus, the mixing element 1 is easy to clean and offers in this respect a substantial advantage as far as hygiene is concerned.

Figure 2:
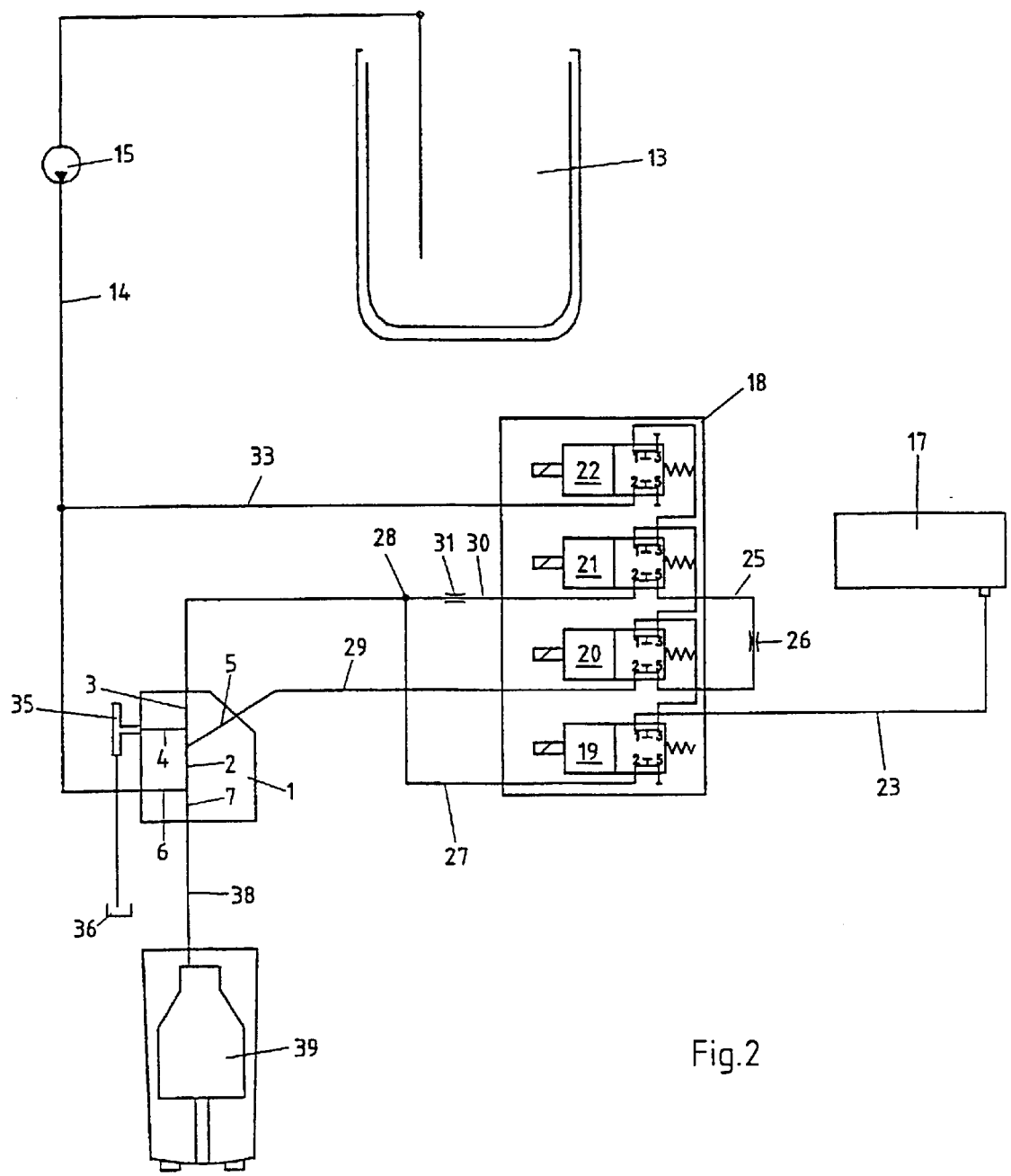
FIG. 2 shows a schematic illustration of the entire assembly for generating milk foam and for heating milk.

In the following, and with the help of FIG. 2, showing a schematic illustration of the entire assembly for generating milk foam and for heating milk, the mode of operation and the function of the mixing element 1, together with the other components, shall be further explained. In the present example, the illustrated assembly forms part of an espresso coffee machine, whereby all the other parts and elements of the coffee machine are omitted from the drawing since they are not essential for this invention.

Besides the mixing element 1, the assembly schematically shown in FIG. 2 comprises a milk supply container 13, connected to the milk inlet channel 6 of the mixing element 1 by means of a milk supply pipe 14. Inserted into the milk supply pipe 14 is a pump 15 for compulsorily feeding milk to the mixing element 1. Moreover, a steam generator 17 is provided which is connected to the mixing element 1 via a valve assembly 18. In all, the valve assembly 18 comprises four valves 19, 20, 21 and 22. A main steam pipe 23 runs from the steam generator 17 to the lowermost valve 19 (as seen in FIG. 2). The four valves 19, 20, 21 and 22 are inter-connected in such a way that the inlets of all four valves 19, 20, 21 and 22 communicate with the outlet of the steam generator. The outlets of the second valve 20 and of the third valve 21 are connected to each other via a pipe 25 provided with a throttle valve 26.

From the outlet of the first valve 19, a first pipe 27 runs via a junction or node 28 to the first steam inlet channel 3 of the mixing element 1. The outlet of the second valve 20 is connected to the second steam inlet channel 5 of the mixing element 1 by means of a second pipe 29. A third pipe 30 runs from the outlet of the third valve 21 to the afore mentioned junction or nod 28, with the result that also the outlet of the third valve 21 is connected to the first steam inlet channel 3 of the mixing element 1. In this third pipe 30, a further throttle valve 31 is inserted. The outlet of the fourth valve 22 is connected to the milk supply pipe 14 by means of a fourth pipe 33.

At the inlet of the air inlet channel 4, a T-shaped distributor member 35 is provided. The downward pointing end of a branch of the T-shaped distributor member leads via a not further designated pipe to a collecting bowl 36. Finally, the outlet channel 7 of the mixing element 1 is connected, by means of a pipe 38, to a distributor element 39 having two outlets. This distributor element 39 simultaneously constitutes the beverage outlet of the espresso coffee machine (not shown) through which also the prepared coffee is dispensed. The cup or mug designated to be filled with the particular beverage to be prepared is placed below the distributor element 39. It is understood that is also possible to place two cups below the distributor element 39 simultaneously, since it is provided with two outlets. A further possibility is to provide the distributor element 39 with three or even more outlets such that three or more cups can be placed below it simultaneously.

In the following, the mode of operation of the assembly will be further described, with reference to FIGS. 1 and 2.

1. Foaming Milk

For foaming milk, the pump 15 is activated and the first valve 19 is opened. By activating the pump 15, milk is fed from the supply container 13 through the milk supply pipe 14 and through the milk inlet channel 6 into the main channel 2 of the mixing element 1. By opening the first valve 19, the pipe 23 is connected to the pipe 27, with the result that the steam generated by the steam generator 17 flows through the first steam inlet channel 3 into the mixing element 1. The milk metered by the pump 15 meets the steam flowing through the main channel 2 upon entering the main channel 2, said steam already having been mixed with air upon passing the low pressure zone constituted by the necking 9, because air has been sucked in through the air inlet channel 4 due to the Venturi effect caused by the steam flowing through the necking 9. The milk, entering the main channel 2 radially and under pressure, immediately is mixed with the hot steam/air mixture flowing through the main channel 2, resulting in a hot mixture consisting of air, steam, condensed water and milk. This mixture expands in the subsequent outlet channel 7, having an increased diameter as compared to the one of the main channel 2, and emulsifies to a homogenous microporous milk foam. Such milk foam can leave the assembly through the distributor element 39 and collected in a suitable beverage container, e.g. a cup (not shown), previously placed below the distributor element 39.

Immediately following the preparation of foamed milk, the inlet and outlet channels are cleaned by means of steam. Once the pump 15 has been shut down, the third and forth valves 21, 22 are opened. Thereby, steam flows through the main channel 2, through the first steam inlet channel 3, through the second steam inlet channel 5, through the milk inlet channel 6 and through the outlet channel 7 of the mixing element 1 to remove possibly present milk residues from these channels. By providing the two throttle valves 26 and 31 as well as the small diameter bore 11 of the milk inlet channel 6, the steam pressure is reduced to such an extent that the occurrence of a high pressure steam jet at the outlets of the distributor element 39 is avoided. To avoid such a steam jet is important insofar as the above mentioned cleaning operation is initiated immediately subsequent to the milk foaming operation, whereby the high pressure steam jet could frighten the operator of the machine and/or cause that the beverage collected in the cup could splash over.

2. Heating Milk

For heating milk, the pump 15 is switched on and the first and second valves 19, 20 are opened. By opening the two valves 19 and 20, steam flows through the first steam inlet channel 3 and through the second steam inlet channel 5 into the main channel 2 of the mixing element 1. Thereby, a substantially greater amount of steam flows through the second steam inlet channel 5 than through the first steam inlet channel 3, since the first steam inlet channel 3 comprises a narrowed cross sectional area in the form of the necking 9. Thereby, also the flow velocity of the steam flowing through the necking 9 is substantially reduced, with the result that hardly any low pressure zone is built up in the necking 9 and, consequently, hardly any air is sucked in through the air inlet channel 4. By means of the steam entering the main channel 2 through the first and second steam inlet channels 3 and 5, the milk flowing into the main channel 2 through the milk supply channel 6 is heated but without being foamed. Depending on the specific design of the assembly, the milk can be heated to a temperature of between appr. 65° C. and 80° C. (appr. 150° F. and 175° F.).

In case the milk should be heated only to appr. 50° C. to 65° C. (appr. 120° F. to 150° F.), it may be sufficient to supply steam to the main channel 2 only through the second steam inlet channel 5. In this case, only the valve 20 is opened. It is understood that various other possibilities exist, for example by feeding steam to the main channel 2 only periodically through both steam inlet channels 3, 5. Thus, by a selective operation of the first and/or second valve 19, 20, the final temperature of the milk can be specifically influenced.

Moreover, it is also possible to specifically control the foaming of the milk by feeding steam to the milk, at least periodically, only through the first steam inlet channel 3. It is understood that the parameters relevant to heating and/or foaming the milk can be specifically affected by the design and/or dimensioning of the components contributing to the heating and foaming operations.

Once the required amount of milk has been heated, the channels of the mixing element 1 are cleaned with steam as has been described herein before in connection with the foaming operation of milk.

By means of the assembly shown in FIG. 2 and discussed above, it is also possible to just feed cold milk from the supply container 13 to e.g. a cup. In this case, the assembly of the invention mainly serves for a subsequent cleaning of the channels by means of steam.

In the present context, the expression "main channel" shall not compellingly mean a channel in a strict sense, but this expression could also be understood as some sort of chamber, as used for example in conventional emulsifying apparatuses known in the prior art. The important fact is that any kind of suitable cavity is provided in which the steam, the air and the milk are mixed in such a way that a homogenous emulsion results. In this sense, also the other "channels" have to be interpreted; they do not have to be channels in the strictest sense of the word. For example, in many cases it may be sufficient to provide any arbitrary kind of air inlet through which air can be sucked into the necking 9.

In contrast to conventional emulsifying devices, in which also the milk is sucked in under the influence of the earlier mentioned Venturi effect caused by the steam flowing through an area with restricted diameter, the compulsory feeding of milk by means of a pump presents the advantage that any desired amount per time unit of milk can be fed and that metering the milk is much more accurate.

Figure 3:
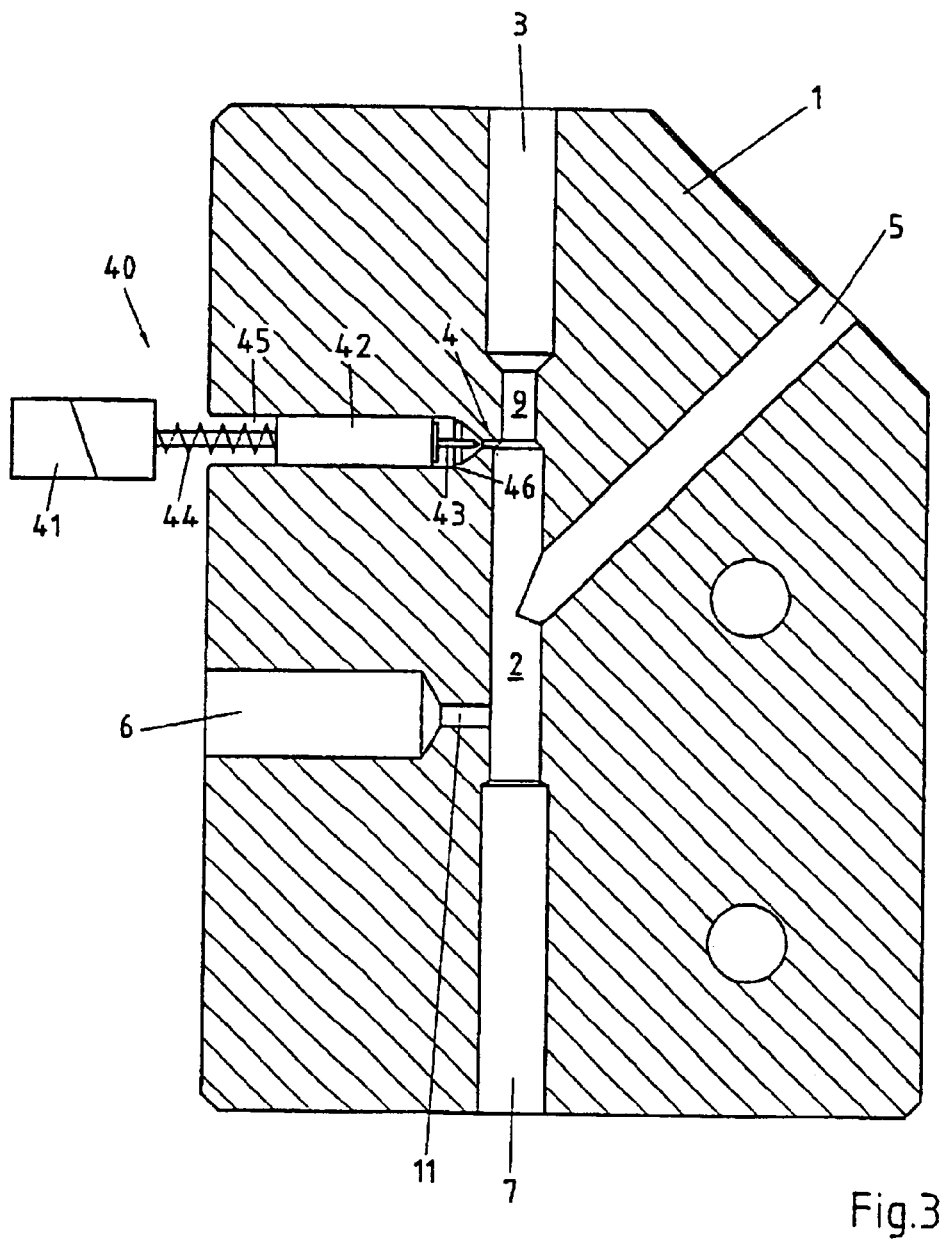
FIG. 3 shows a cross sectional view of a second embodiment of a mixing element.

FIG. 3 shows a cross sectional view of another embodiment of a mixing element. Compared to the mixing element 1 shown in FIG. 1 and discussed in connection therewith herein before, the mixing element according to FIG. 3 additionally comprises a device 40 for selectively opening or closing the air inlet channel 4. This device 40 comprises an electro magnet 41 connected to a piston 42 slidably received in a bore 45. The front side (i.e. the right side as seen in FIG. 3) of the piston 42 is provided with a closure element 43 by means of which the air inlet channel may be sealed. A pressure spring 44 is inserted between the electro magnet 41 and the piston 42. The pressure spring biases the piston 42 in a direction towards the necking 9, with the result that the air inlet channel 4 is sealed by the closure member if the device 40 is in its rest position, i.e. if the electro magnet 41 is not energized. The bore 45 is provided with a shoulder 46 located in the region of the end of the bore 45 next to the air inlet channel 4. The shoulder 46 serves as a stop member against which the piston 42 can rest with its annular front face. It is understood that a stop member could be located at the opposite end of the bore 45, i.e. next to the electro magnet 41. An activation of the electro magnet 41 causes a movement of the piston 42 away from the air inlet channel 4 into a position as shown in FIG. 3 in which the air inlet channel 4 is open. Through a not shown bore, opening into the chamber in front of the piston 42, air can be sucked in, if required.

By providing the device 40 for sealing the air inlet channel 4, it can be ensured that the air inlet channel 4 can be closed if desired, for example if cold milk flows through the mixing element 1, thereby avoiding any milk entering the air inlet channel 4 or flowing out of it in an undesired manner. Thus, it can be avoided that the air inlet channel 4 is blocked by milk having entered it and having become sour and/or solid after a certain period of time. Moreover, upon each activation of the electro magnet 41, the air inlet channel 4 is mechanically cleaned by the closure member 43 and any residues that may have been left in the channel 4 are removed. Preferably, the device 40 being in its rest position with the air inlet channel 4 sealed, the end of the substantially needle shaped closure member 43 protrudes to a small extent out of the air inlet channel 4 such that the latter one is entirely occupied by the closure member 43, thus avoiding that any undesired substances might enter the air inlet channel 4.

The advantages of the assembly according to the present invention can be summarized as follows:

Both microporous milk foam and hot milk can be produced.

By the provision of two steam inlet channels, the amount of steam available to heat the milk can be increased and specifically influenced, respectively.

The final temperature of the milk can be specifically selected.

The desired final temperature of the milk is very accurately reproducible.

The mixing element is of compact design and can be easily manufactured.

The mixing element comprises only straight passages and particularly avoids any dead chambers.

No dedicated emulsifying chamber has to be provided for foaming the milk.

The mixing element has not to be located immediately upstream the beverage outlet, since the produced milk foam can flow along an extended path to a beverage outlet without quality loss.

The assembly is particularly well suited to be incorporated into an espresso coffee machine, and even more particularly into a fully automatic espresso coffee machine in which the preparation of the beverage is controlled by a processor; thereby, the flexibility of such an automatic machine is increased.

Due to the fact that the milk is compellingly fed by a pump, any desired amount per time unit of milk can be fed and metered with increased accuracy.

What is claimed is:

1. Assembly for generating milk foam and for heating milk, comprising a milk supply container means, a steam generator means and a mixing element means, said mixing element means comprising:
    a first steam inlet channel means having a first inner diameter;
    a necking means located downstream and communicating with said first steam inlet channel means, having an inner diameter which is smaller than said first diameter of said first steam inlet channel means;
    an air inlet channel means opening into and communicating with said necking means;
    a milk inlet channel means;
    a main channel means having a second inner diameter and comprising an inlet end and an outlet end, said inlet end communicating with said necking means, and said milk inlet channel means opening into and communicating with said main channel means at a location along said main channel means that is downstream said inlet end thereof; and
    a second steam inlet channel means opening into and communicating with said main channel means at a point along said main channel means located between said necking means and the opening of said milk inlet channel means.

2. Assembly according to claim 1, further comprising means for compellingly feeding milk from said milk supply container to said milk inlet channel means.

3. Assembly according to claim 1 in which said mixing element means further comprises an outlet channel means communicating with said outlet end of said main channel means and having a third inner diameter which is greater than said second diameter of said main channel means.

4. Assembly according to claim 1 in which said second steam inlet channel means extends oblique with regard to said main channel means.

5. Assembly according to claim 1 in which said first steam inlet channel means opens substantially axially into said necking means, and in which said air inlet channel means opens substantially radially into said necking means.

6. Assembly according to claim 1 in which said milk inlet channel means opens substantially radially into said main channel means.

7. Assembly according to claim 1, further comprising a valve assembly means having inlet means and outlet means, said inlet means communicating with said steam generator means and said outlet means communicating with said mixing element means, and control means adapted to selectively control said valve assembly means such that steam is fed only to said first steam inlet channel means or only to said second steam inlet channel means or to both said first and second inlet channel means simultaneously.

8. Assembly according to claim 7 in which said control means of said valve assembly means is adapted to feed steam to said milk inlet channel means.

9. Assembly according to claim 7 in which said valve assembly means comprises at least three individually controllable valve means.

10. Assembly according to claim 1 in which said main channel means, said first steam inlet channel means, said second steam inlet channel means, said air inlet channel means, said milk inlet channel means and said outlet channel means all extend in straight direction.

11. Assembly according to claim 1 in which said main channel means of said mixing element means is constituted by a bore.

12. Assembly according to claim 1 in which said main channel means, said first steam inlet channel means, said second steam inlet channel means, said air inlet channel means, said milk inlet channel means and said outlet channel means all are constituted by bores.

13. Assembly according to claim 1 in which said milk inlet channel means comprises a first portion located next to said main channel means and having a first cross sectional area, and a second portion located remote from said main channel means and having a second cross sectional area, said second cross sectional area being smaller than said first cross sectional area.

14. Assembly according to claim 1 in which said mixing element is of a one piece design.

15. Assembly according to claim 1, further comprising means for selectively sealing or opening said air inlet channel means.

16. Espresso coffee machine, incorporating an assembly for generating milk foam and for heating milk, said assembly comprising a milk supply container means, a steam generator means and a mixing element means, and said mixing element means comprising:
    a first steam inlet channel means having a first inner diameter;
    a necking means located downstream and communicating with said first steam inlet channel means, having an inner diameter which is smaller than said first diameter of said first steam inlet channel means;
    an air inlet channel means opening into and communicating with said necking means;
    a milk inlet channel means;
    a main channel means having a second inner diameter and comprising an inlet end and an outlet end, said inlet end communicating with said necking means, and said milk inlet channel means opening into and communicating with said main channel means at a location along said main channel means that is downstream said inlet end thereof; and
    a second steam inlet channel means opening into and communicating with said main channel means at a point along said main channel means located between said necking means and the opening of said milk inlet channel means.

17. A method of mixing milk with steam comprising the steps of:
    providing a milk supply container means, a steam generator means, a valve assembly means and a mixing element means, wherein said mixing element means comprises:
        a first steam inlet channel means having a first inner diameter;
        a necking means located downstream and communicating with said first steam inlet channel means, having an inner diameter which is smaller than said first diameter of said first steam inlet channel means;
        an air inlet channel means opening into and communicating with said necking means;
        a milk inlet channel means;
        a main channel means having a second inner diameter and comprising an inlet end and an outlet end, said inlet end communicating with said necking means, and said milk inlet channel means opening into and communicating with said main channel means at a location along said main channel means that is downstream said inlet end thereof; and a second steam inlet channel means opening into and communicating with said main channel means at a point along said main channel means located between said necking means and the opening of said milk inlet channel means;

feeding milk from said milk supply container means to said milk inlet channel means of said mixing element means; and selectively feeding steam from said steam generator means via said valve assembly means only to said first steam inlet channel means of said mixing element means, or only to said second steam inlet channel means of said mixing element means, or simultaneously to both said first and second steam inlet channel means of said mixing element means.

18. Assembly according to claim 8 in which said valve assembly means comprises at least three individually controllable valve means.

* * * * *